(12) United States Patent
Takahashi

(10) Patent No.: US 9,258,119 B2
(45) Date of Patent: Feb. 9, 2016

(54) TRUSTED TAMPER REACTIVE SECURE STORAGE

(71) Applicant: Richard J. Takahashi, Phoenix, AZ (US)

(72) Inventor: Richard J. Takahashi, Phoenix, AZ (US)

(73) Assignee: Cyber Solutions International, LLC, Charleston, SC (US)

( * ) Notice: Subject to any disclaimer, the term of this patent is extended or adjusted under 35 U.S.C. 154(b) by 0 days.

(21) Appl. No.: 14/272,873

(22) Filed: May 8, 2014

(65) Prior Publication Data
US 2014/0337642 A1 Nov. 13, 2014

Related U.S. Application Data

(60) Provisional application No. 61/821,094, filed on May 8, 2013, provisional application No. 61/821,010, filed on May 8, 2013.

(51) Int. Cl.
*H04L 9/08* (2006.01)
*G06F 21/78* (2013.01)
*G06F 21/86* (2013.01)

(52) U.S. Cl.
CPC .............. *H04L 9/0877* (2013.01); *G06F 21/78* (2013.01); *G06F 21/86* (2013.01); *G06F 2221/2101* (2013.01); *H04L 2209/12* (2013.01)

(58) Field of Classification Search
CPC ... H04L 9/0877; H04L 2209/12; G06F 21/78; G06F 21/86; G06F 2221/2101
USPC .......................................................... 713/194
See application file for complete search history.

(56) References Cited

U.S. PATENT DOCUMENTS

| | | | |
|---|---|---|---|
| 7,898,090 B1* | 3/2011 | Eaton | 257/777 |
| 2006/0023486 A1* | 2/2006 | Furusawa et al. | 365/145 |
| 2014/0130189 A1* | 5/2014 | Hadley | 726/34 |

* cited by examiner

*Primary Examiner* — Kambiz Zand
*Assistant Examiner* — Aubrey Wyszynski
(74) *Attorney, Agent, or Firm* — Bejin Bieneman, PLC

(57) ABSTRACT

A cryptographic system includes a memory device and a processor. The memory device has at least two sections, including a first section and a second section. The processor is configured to determine a mode of operation, receive a signal, and selectively zeroize at least one section of the memory device based at least in part on the received signal and the determined mode of operation.

17 Claims, 4 Drawing Sheets

TRUSTED TAMPER REACTIVE SECURE STORAGE

CROSS-REFERENCE TO RELATED APPLICATIONS

This application claims priority to U.S. Provisional Application Ser. Nos. 61/821,094 and 61/821,010, both titled "TRUSTED TAMPER REACTIVE SECURE STORAGE" and filed on May 8, 2013, the contents of which are hereby incorporated by reference in their entireties.

BACKGROUND

Electronically stored data can be accessed by unauthorized individuals if the data is not securely stored. Various techniques exist for securely storing data. For example, encryption includes coding data so that only persons with devices that have the correct key can decrypt and view the data. The Data Encryption Standard (DES), triple-DES, and the Advanced Encryption Standard (AES) are some examples of encryption standards. Another time data becomes susceptible to unauthorized access is when the data is "deleted." Deleting data does not necessarily remove the data from the device memory. Although hidden, sometimes the "deleted" data will remain on the memory device until new data is written to the portions of the memory device where the "deleted" data resides. Thus, deleting sensitive data is not always enough to prevent sensitive data from access by unauthorized individuals.

DETAILED DESCRIPTION

An exemplary cryptographic system includes a memory device and a processor. The memory device has at least two sections, including a first section and a second section. The processor is configured to determine a mode of operation, receive a signal, and selectively zeroize at least one section of the memory device based at least in part on the received signal and the determined mode of operation. The memory device may include a storage module for cryptographic keying material with security features. In general, the storage module includes an embedded processor, such as an ARM® processor, analog and digital logic, and battery backed memories on a single device. The storage module may be embedded as part of a larger device or circuit board to provide for secure storage, tamper resistance, and zeroization of cryptographic variables used by other chips or devices to perform security-relevant operations. The storage module may include a battery backup of various types (e.g., a 3v 120 mAh battery) and functions, after initial configuration, for a period of many years without requiring a battery change or additional configuration. This long unattended shelf life, combined with the built-in tamper-resistant features, make the storage module a building block for security devices.

Figure 1:
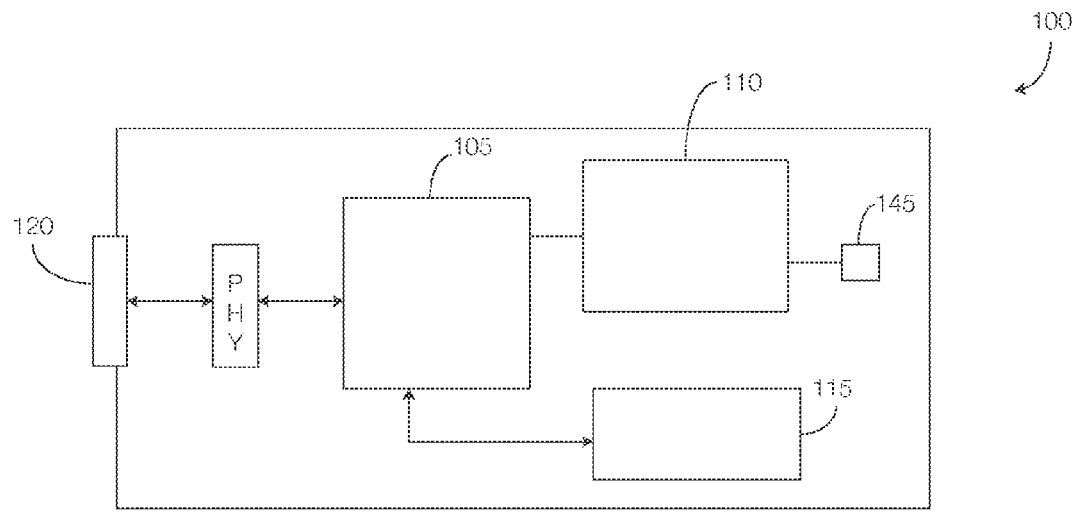
FIG. 1 is a block diagram of an exemplary cryptographic system.

FIG. 1 is a block diagram of an exemplary cryptographic system 100. The cryptographic system 100 may be an insertable or embeddable into a host terminal or platform (referred to below as the "host"). The cryptographic system 100 may be reprogrammable with an anti-tamper cryptographic module which provides cryptographic services to the host.

The cryptographic system 100 may be implemented using an embedded processor, such as a General Purpose Processor (GPP), in a Field Programmable Gate Array (FPGA) 105, which may make the system reprogrammable while offering implementation flexibility, low power, and low cost capability. Also, an FPGA 105 provides a path to convert over to an Application Specific Integrated Circuit (ASIC) for cost and power reduction. The cryptographic system 100 may be completely reprogrammable in order to support software, firmware, and cryptographic services required by future waveforms. The combination processor and FPGA 105 may allow for new and updated software or firmware to be installed without a hardware upgrade.

As shown in FIG. 1, the cryptographic module may include a modular design having, for instance, an FPGA 105 that can be programmed for module input/output, cryptographic engines 130, an RISC-32 processor, a NAND Hash controller interface, and an SPI interface 140 to the Tamper Reactive Secure Storage (TRSS) 110, and Flash memory 115. The TRSS 110 as the Trust Anchor may extend the integrity verification of the cryptographic application code base and certified hardware signature verification. The TRSS 110 may also be used to authenticate a secure boot file for the FPGA 105.

The TRSS 110, which may work in concert with an anti-tamper sensor 145, may be the main tamper detection device. The cryptographic module may have additional protective tamper detection technologies to augment the TRSS 110 tamper capabilities. The cryptographic module FPGA 105 may provide lower secrecy level information, non-Cryptographic Controlled Item (CCI) cryptographic, and other security services for secure functions. The FPGA 105 may be designed to perform all of the secure cryptographic functions from Advanced Encryption Standard (AES), traffic inspection, security policy enforcement, key handling, and logging and monitoring to public key algorithms. One advantages of using FPGA technology is that future software, firmware, or both can be implemented with minimal or without any hardware modifications. Also, the FPGA 105 may be designed with a NAND FLASH controller 135 that using an Open NAND Flash Interface (ONFI) 2.2 compliant for high-capacity Multi-Level Cell (MLC) and Single-Level Cell (SLC) NAND flash memories. The Module I/O may be programmable for the target interface. The unclassified or classified FGPA images may be saved in a key that has been protected by encryption or other means so that it can be distributed without fear of it being stolen (BLACK) from the Flash memories 115 when the cryptographic system 100 is not operational. In one possible implementation, the unclassified or classified FPGA images may be decrypted and loaded only when the cryptographic system 100 is operational.

The cryptographic system 100 may perform startup, shutdown, and restart operations independent of the other shutdown (orderly shutdown or unscheduled shutdown) operations.

Figure 2:
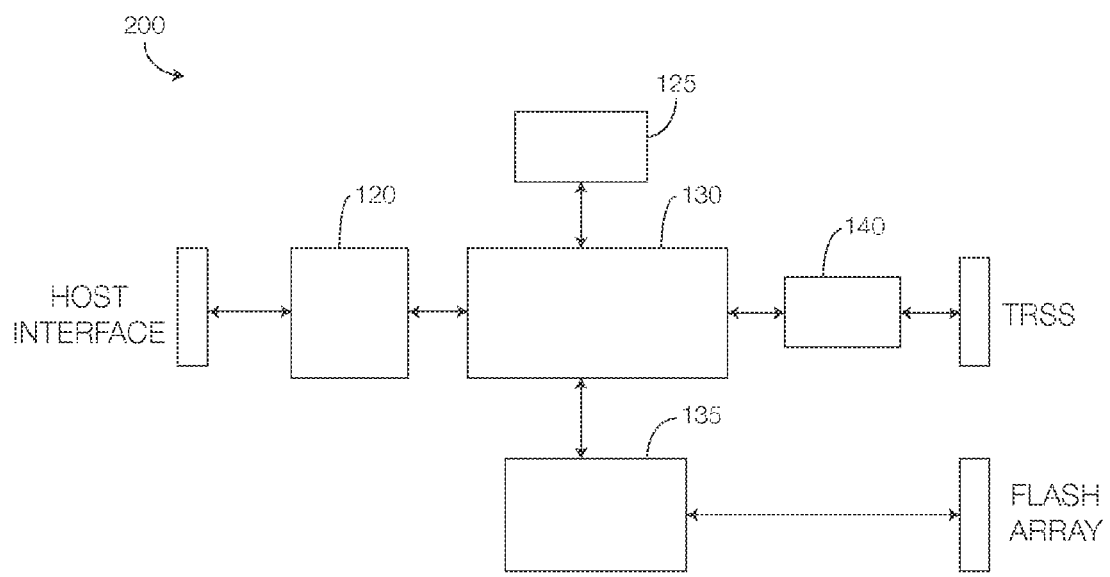
FIG. 2 is a block diagram of an exemplary field-programmable gate array (FPGA) design for a cryptographic system.

FIG. 2 is a block diagram of the FPGA design 200 for a cryptographic system 100. The FPGA design 200 may include a Module interface 120, an RISC 32-bit processor 125, Cryptographic engines 130, a NAND Flash controller 135, and an SPI interface. The cryptographic system FPGA 105 may be optimized for a tailored IASRD and may be designed to meet SAB assurance and Fail Safe Design criteria. The FPGA 105 may be designed for handling datagram security policies, control, bypass, data and header detection, and construction and manipulation for both inbound and outbound traffic. The cryptographic system 100 may support only one classification level, one logical channel modes on a packet-by-packet basis. The FPGA RISC processor 125 may control plane code execution, such as session negotiation, channel creation, and exception handling. The RISC may also provide a way to handle on-chip execution of third party control point software for key handling, storage and key management, or exchange functions. The FPGA 105 may support a firmware-based math engine for accelerating public-key encryption and signing operations. The FPGA 105 may have all digital Fail Safe Randomizer and intelligent power management for all the constituent parts. The FPGA design 200 may be capable of multi-cast encryption with bypass operations, key handling and storage, DS-101 Fill processing, and anti-tamper with zeroization logic. The FPGA packet engine may allow for hardware enforced logical separation for the bypass, encrypt, decrypt, data stream processing with management using, e.g., both the embedded RISC control plane processor 125 and state machines. The RISC may handle channel creation, loading the correct data, as well as unwrapping and loading the appropriate operational key per application.

Figure 3:
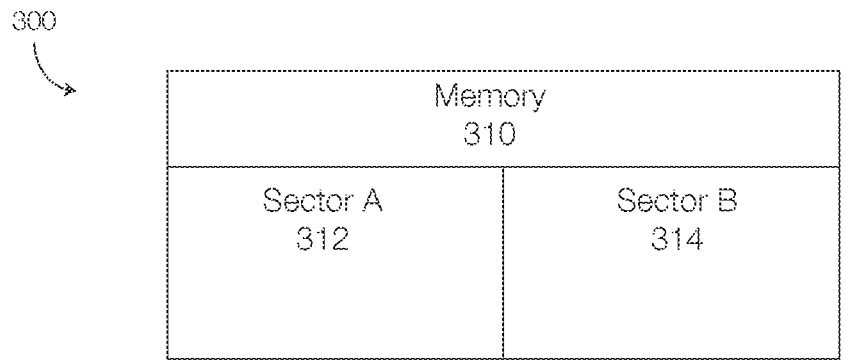
FIG. 3 is an example of an exemplary two zone zeroizable memory for a cryptographic system.

FIG. 3 is an example of a two zone zeroizable memory for a cryptographic system 100. Memory 310 may be included in the trust of tamper reactive secure storage device with a battery backup. The memory may include a Sector A 312 and a sector B 314 that may be zeroized independently. This may provide for selective zeroization rather than zeroization of the entire memory 310. Therefore, section A 312 may be zeroized at the same or different time as sector B 314. For instance, in a first mode of operation, in accordance with a first input, both section A 312 and section B 314 may be zeroized. A second input, however, may zeroize section B 314 while section A 312 remains unchanged. In this first mode of operation, an interrupt signal may be received when a zeroize condition is detected on an input pin associated with the zeroization of section B 314. The interrupt signal may be activated in response to an event on a pin associated with the zeroization of section A 312 or due to an internal tamper event detected by, e.g., the sensor 145. Examples of internal tamper events detectable by the sensor 145 may include a metal tamper, a high/low temperature detection, or the like. Further, in the first mode of operation, a hold-up battery or independent power supply may be connected to a battery input pin. In the second mode of operation, an input is received at a pin associated with the zeroization of section A 312, that section 312 may be securely erased (e.g., zeroized) while the memory of section B 314 remains unchanged. Conversely, when an input is received at a pin associated with the zeroization of section B 314, section 314 may be securely erased (e.g., zeroized) while the memory of section A 312 remains unchanged. As a further precaution, any change to the mode of operation may result in the entire battery-backed memory (e.g., sections A and B 312, 314) being zeroized.

Figure 4:
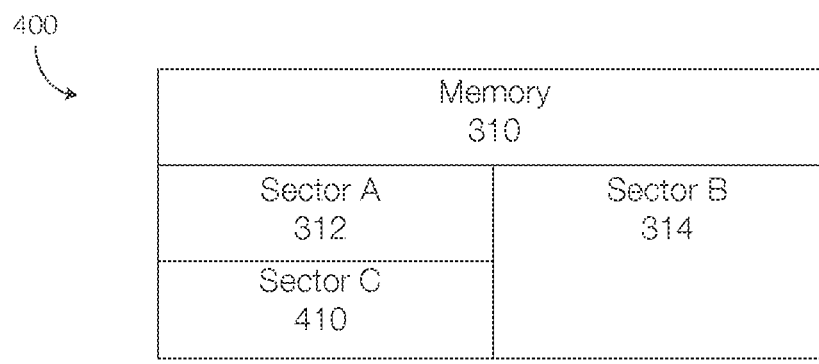
FIG. 4 is an example of an exemplary three zone zeroizable memory for a cryptographic system.

FIG. 4 is an example of a three zone zeroizable memory for a cryptographic system 100. Memory 310, as shown, includes Sector A 312, Sector B 314, and Sector C 410. Although it is shown here as having three separate memory regions 312, 314, 410, the cryptographic system 100 may include many separate memory regions. This provides for flexibility in design to be able to zeroize certain memory regions without zeroizing the entire memory 310.

Figure 5:
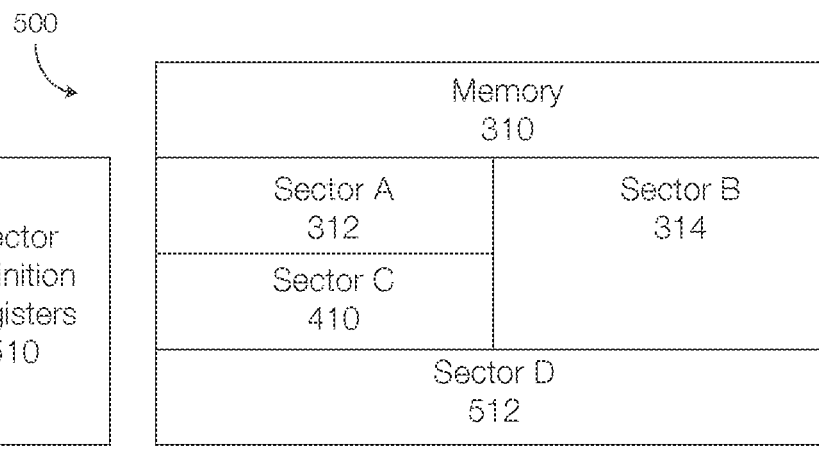
FIG. 5 is an example of an exemplary configurable multi-zone zeroizable memory for a cryptographic system.

FIG. 5 is an example of a configurable multi-zone zeroizable memory for a cryptographic system 100. Memory 310, as shown, includes four sectors 312, 314, 410, 512. Each of these memory sectors 312, 314, 410, 512 may be defined by sector definition registers 510. Sector definition registers 510 may be programmed as a one-time event, or they may be reprogrammable by the cryptographic system 100. For example, sector definition registers 510 may be included in a portion of memory 310 that is battery backed and tamper-resistant. When programmed, sector definition registers 510 may define which memory portions are separately zeroizable within memory 310. The system shown in FIG. 5 may provide flexibility in design and at run time if, for example, the programming of the module interfacing the tamper-resistant memory is changed. Then, the memory 310 configuration may also be changed. Alternatively, sector definition registers 510 may be programmed in flash memory or hardcoded in the mask.

Figure 6:
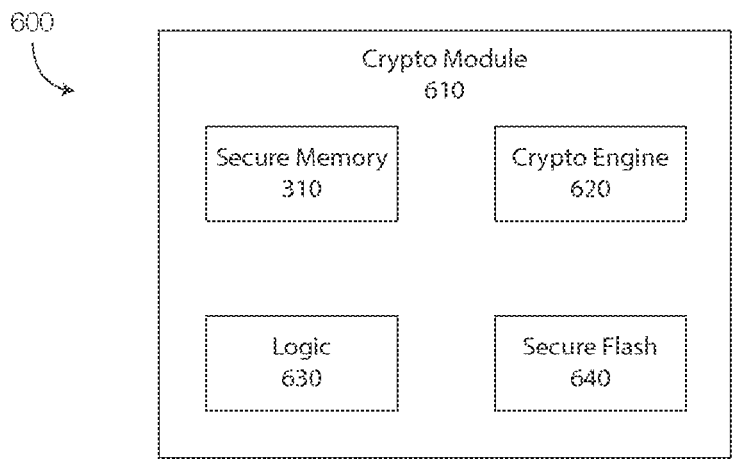
FIG. 6 is a block diagram of an exemplary cryptographic module.

FIG. 6 is a block diagram 600 of a cryptographic module 610 (e.g., a Trusted Tamper Reactive Secure Storage module) having a secure memory 310, a cryptographic engine 620, logic 630, and a secure flash 640.

Cryptographic module 610 may include cryptographic engine 620 to communicate with a host. For example, if one cryptographic module 610 wants to determine if reprogramming of the host is desired, it may read out portions of the host firmware and verify the firmware against a hash code stored in secure memory 310 before providing full access to secure memory 310. Additionally, secure flash 640 may store the firmware for the host and provide the firmware during boot. Cryptographic module 610 may be configured to verify that the host has loaded the firmware properly and has not been tampered with by verifying the firmware with a hash code stored in secure memory 310. Moreover, secure flash 640 may store the firmware in encrypted form with the key stored in secure memory 310. Cryptographic module 610 may then communicate with a cryptographic engine in the host to transfer the firmware securely from secure flash 640 to the host. In this way, each cryptographic module 610 having secure flash 640 may be encrypted with a unique key stored in secure memory 310, providing enhanced security for a platform. For instance, if one product were compromised, the encryption key for secure flash 640 may only capable of decrypting that product's secure flash. It would not provide for decrypting any other secure flash 640 and any other cryptographic module 610 across the product platform.

Figure 7:
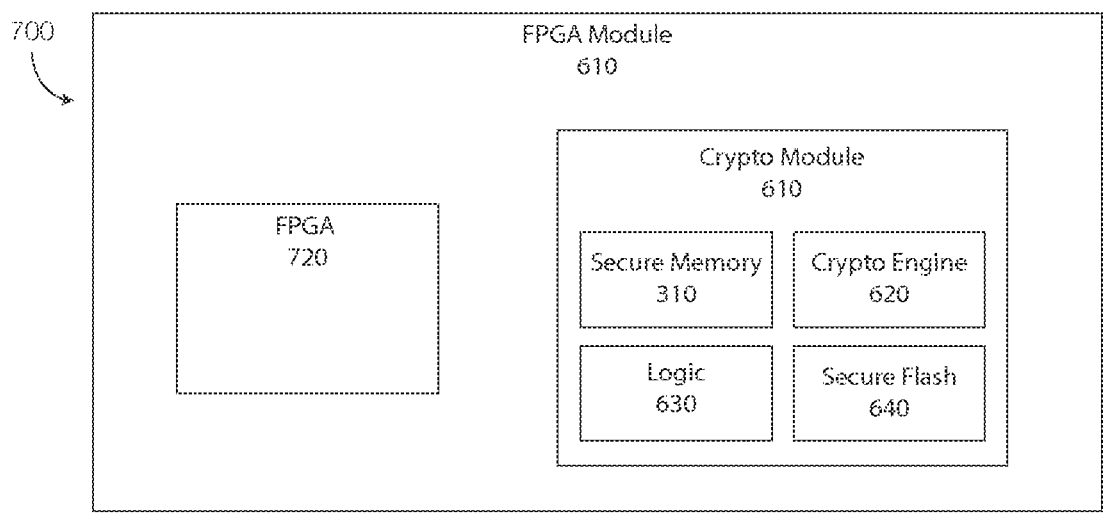
FIG. 7 is a block diagram of an exemplary FPGA module.

FIG. 7 is a block diagram 700 of an FPGA module including an FPGA 720 and a cryptographic module 610. As discussed above with reference to FIG. 6, FPGA 720 may be programmed during the power-on sequence with a boot loader. The boot loader may securely access cryptographic module 610 and receive the authenticated and encrypted programming codes for the FPGA 720 from secure flash 640. Alternatively, FPGA 720 may have a cryptographic engine soft or hardcoded that may provide for connection to cryptographic module 610, to decrypt the reception of secure flash 640 for self-programming.

Figure 8:
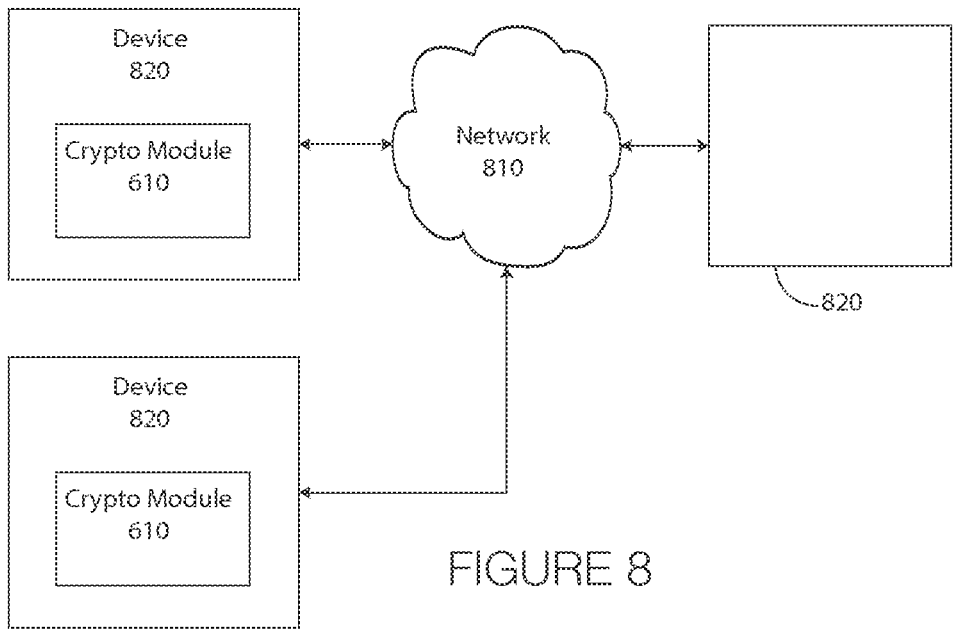
FIG. 8 is a diagram of an exemplary device having a cryptographic module.

FIG. 8 is a diagram of a device 820 having a cryptographic module 610 communicating with a network 810 and servers 820. In general, device 820 may include a computing device, a phone, a tablet, a radio, a stand-alone encryptor, a token, and an in-line Ethernet encryption device. In one example, device 820 may include an automated teller machine (ATM) that connects to network 810 and to back-end servers 820. If device 820 is compromised, the tamper reactive secure storage device includes a unique key for the FPGA of device 820. Thus, an attacker would not have access to device 820A because device 820A has its own unique key stored in its tamper reactive secure storage device. In this way, each device 820 may be deployed with unique encryption stored in tamper reactive secure storage. If any device 820 were compromised, traffic from the compromised device 820 may be compromised, but traffic from other devices 820A may remain secure.

In general the systems described herein may apply to government applications, military applications, enterprise applications, and consumer-level applications. Moreover, they are not limited to communication protocols. The systems may include the firmware programming of a device, the authentication of a device, the authentication of the user, as well as generally securing content. Additionally, the systems described herein may be used in real-time systems for streaming information, transactions, in addition to storage.

Figure 9:
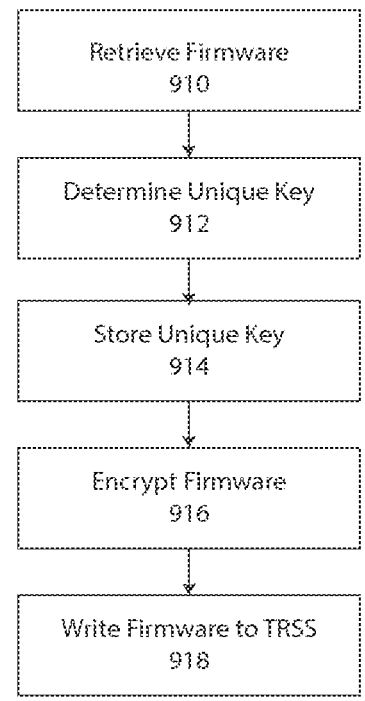
FIG. 9 is an exemplary flow diagram of a process for encrypting information to a secure flash device.

FIG. 9 is a flow diagram of encryption of information to secure flash. The process may be implemented on a computing device and executed by one or more components of the computing device, such as a processor 125.

At block 910, firmware is retrieved during the FPGA operational power-on sequence. The firmware may be stored in a secure device connected to a FPGA.

At block 912, a unique key may be determined. This unique key may be used to encrypt information for the trusted tamper reactive secure storage.

At block 914, the unique key may be stored. Storage of the unique key may be kept at the manufacturing line as well as stored in the trusted tamper reactive storage device. This provides for communication with the cryptographic module 610 from servers (e.g. such as servers 820).

At block 916, the firmware may be encrypted using the unique key. Encryption may be performed by the manufacturing equipment or it may be performed by the cryptographic module 610 itself if the cryptographic module 610 includes a cryptographic engine 620.

At block 918, the firmware may be written to the trusted tamper reactive storage device.

As each cryptographic module 610 is programmed during assembly, each one includes a unique key such that if a module is compromised, then the other modules are not, because only one unique key has been compromised.

The system shown in the Figures may take many different forms and include multiple and/or alternate components and facilities. The exemplary components illustrated are not intended to be limiting. Indeed, additional or alternative components and/or implementations may be used.

In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract section is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A cryptographic system comprising:
  a memory device having at least two sections, including a first predetermined section and a second predetermined section; and
  a processor configured to determine a mode of operation among at least a first mode of operation and a second mode of operation, receive a signal, and selectively zeroize at least one of the first predetermined section and the second predetermined section of the memory device based at least in part on the received signal and the determined mode of operation,
  wherein the signal includes one of a first input signal corresponding to the first mode of operation and a second input signal corresponding to the second mode of operation, wherein the processor is programmed to zeroize the first predetermined section in response to receiving the first input signal and the second predetermined section in response to receiving the second input signal.

2. The cryptographic system of claim 1, wherein the processor selectively zeroizes the first predetermined section and the second predetermined section of the memory device in response to detecting a change in the mode of operation from one of the first mode of operation and the second mode of operation to the other of the first mode of operation and the second mode of operation.

3. The cryptographic system of claim 1, wherein the processor leaves the first predetermined section of the memory device unchanged in response to receiving the second input signal while operating in the first mode of operation and wherein the processor leaves the second predetermined section of the memory device unchanged in response to receiving the first input signal while operating in the first mode of operation.

4. The cryptographic system of claim 1, wherein the processor selectively zeroizes the first predetermined section of the memory device in response to receiving the first input signal at a first pin while operating in the first mode of operation.

5. The cryptographic system of claim 4, wherein the processor leaves the second predetermined section of the memory device unchanged in response to receiving the first input signal at the first pin while operating in the first mode of operation.

6. The cryptographic system of claim 4, wherein the processor selectively zeroizes the second predetermined section of the memory device in response to receiving the second input signal at a second pin while operating in the second mode of operation.

7. The cryptographic system of claim 6, wherein the processor leaves the first predetermined section of the memory device unchanged in response to receiving the second input signal at the second pin while operating in the second mode of operation.

8. The cryptographic system of claim 1, wherein the signal includes an interrupt signal, and wherein the processor is configured to zeroize at least one of the first predetermined section and the second predetermined section of the memory device based at least in part on the interrupt signal.

9. The cryptographic system of claim 8, wherein the interrupt signal is activated in response to a tamper event.

10. The cryptographic system of claim 9, wherein the tamper event includes at least one of a metal tamper and a high/low temperature detection.

11. A method comprising:
  determining a mode of operation of a cryptographic module, the mode of operation including one of at least a first mode of operation and a second mode of operation;
  receiving one of a first input signal and a second input signal at a pin of a processing device, the first input signal corresponding to the first mode of operation and the second input signal corresponding to the second mode of operation; and
  one of:
    selectively zeroizing a first predetermined section of a memory device in response to receiving the first input signal while operating in the first mode of operation, and
    selectively zeroizing a second predetermined section of the memory device in response to receiving the second input signal while operating in the second mode of operation.

12. The method of claim 11, further comprising:
  detecting a change in the operating mode from one of the first mode of operation and the second mode of operation to the other of the first mode of operation and the second mode of operation; and selectively zeroizing the first predetermined section and the second predetermined section of the memory device in response to detecting the change in the mode of operation.

13. The method of claim 12, wherein selectively zeroizing the first predetermined section of the memory device includes leaving the second predetermined section of the memory device unchanged and wherein selectively zeroizing the second predetermined section of the memory device includes leaving the first predetermined section of the memory device unchanged.

14. The method of claim 11, wherein selectively zeroizing the first predetermined section of the memory device includes selectively zeroizing the first predetermined section of the memory device in response to receiving the first input signal at a first pin while operating in the first mode of operation.

15. The method of claim 14, wherein selectively zeroizing the second predetermined section of the memory device includes zeroizing the second predetermined section of the memory device in response to receiving the second signal at a second pin while operating in the second mode of operation.

16. The method of claim 11, further comprising:
receiving an interrupt signal; and
zeroizing at least one of the first predetermined section and the second predetermined section of the memory device in response to receiving the interrupt signal.

17. The method of claim 16, wherein the interrupt signal is activated in response to a tamper event including at least one of a metal tamper and a high/low temperature detection.

\* \* \* \* \*